_United States Patent_ [19]

Sugahara et al.

[11] 3,787,330

[45] Jan. 22, 1974

[54] REFINING AGENT FOR OILY SUBSTANCES

[75] Inventors: Yujiro Sugahara, Tokyo; Kouichi Usui, Tsuruoka-shi; Hiroyuki Naito, Tsuruoka-shi; Syoji Matuzawa, Tsuruoka-shi, all of Japan

[73] Assignee: Mizusawa Kagaku Kogyo Kabushiki Kaisha, Higashi-ku, Osaka, Japan

[22] Filed: Sept. 26, 1969

[21] Appl. No.: 861,494

[30] Foreign Application Priority Data

Oct. 1, 1968  Japan............................... 43-70809
Aug. 14, 1969  Japan............................... 44-63837

[52] U.S. Cl................ 252/437, 252/450, 423/335, 423/429
[51] Int. Cl............................................. B01j 11/62
[58] Field of Search........... 252/450, 446, 443, 437; 208/300, 307; 260/428; 23/110 R, 182 R

[56] References Cited
UNITED STATES PATENTS

| | | | |
|---|---|---|---|
| 3,617,215 | 11/1971 | Sugahara et al. | 252/450 X |
| 3,130,170 | 4/1964 | Stover | 252/450 |
| 2,307,795 | 1/1943 | Krarbt | 196/52 |
| 3,501,418 | 3/1970 | Magee | 252/450 |
| 2,192,000 | 2/1970 | Wilson | 252/2 |
| 2,202,806 | 5/1940 | Alton | 210/203 |
| 1,114,095 | 10/1914 | Baskerville | 260/428 X |
| 1,739,796 | 12/1929 | Mahler | 260/428 X |
| 3,369,993 | 2/1968 | Mills | 208/26 |
| 3,335,098 | 8/1967 | Haden | 252/450 |
| 2,671,058 | 3/1954 | Mickelson | 252/450 |

_Primary Examiner_—Daniel E. Wyman
_Assistant Examiner_—W. J. Shine
_Attorney, Agent, or Firm_—Sherman and Shalloway

[57] ABSTRACT

A refining agent for oily substances comprising granules or small aggregates of an acid-treated product of clay consisting predominantly of montmorillonite having a specific surface area of at least 120 square meters per gram and a pore volume of at least 0.7 milliliter per gram, said pore volume being defined by the equation:

$$\rho = (1/d_1) - (1/d_2)$$

wherein $d_1$ is the apparent density of the small aggregates, $d_2$ is the true density of the acid-treated product of montmorillonitic clay, and $\rho$ is the pore volume in milliliters per gram. Such granules or small aggregates are prepared by a process comprising intimately contacting a clay consisting predominantly of montmorillonite and containing acid-soluble basic constituents with an acid or aqueous solution thereof and forming a small aggregrate-like solid product therefrom; drying the product; extracting the basic constituents from the solid product; and thereafter recovering the small aggregates.

3 Claims, No Drawings

REFINING AGENT FOR OILY SUBSTANCES

This invention relates to a refining agent for such oily substances as higher fatty acids, fats and oils or mineral oils. More particularly, this invention relates to a refining agent for oily substances, which consists of granules or aggregates of an acid-treated product of clay, principally montmorillonite; as well as to a refining process for oily substances wherein the foregoing purifying agent is used.

Heretofore, for improving the color of such oily substances as the higher fatty acids, animal or vegetable oils and fats, and mineral oils, it has generally been the practice to contact these substances under heating with a powdery activated clay or acid clay of particle size, all passing at least 100 Tyler mesh. While this known method is satisfactory in that a uniform contact between the oily substances and the powdery clay is maintained and hence the decolorizing of the oily substances is fully accomplished, it still has numerous defects which need to be improved. In the first place, a large amount of the oily substances is retained in the powdery clay with the consequence that there is a loss of the oily substances amounting to 60 – 70 percent of the weight of the clay used. Further, a filtering operation, e.g., using a filter press, is necessary for separating the refined oil from the activated clay in this known method. Accordingly, not only a special step and labor are required for this purpose, but also difficulty is involved in carrying out the operation of continuously decolorizing and refining the oily substance. Moreover, there is the drawback that the quality of the oily substance is deteriorated during the filtering operation as a result of contact of the hot oily substance with air. In addition, spent clay containing a large amount of oily substance is produced as a by-product according to this method. When this spent clay is discarded in this state, not only is there a hazard of fire but also the so-called problem of pollution arises since it pollutes rivers and seas or gives off an offensive odor. Thus, since it cannot be utilized for reclamation projects, its disposal becomes a problem. Again, in order to prevent such pollution problems, steaming has been tried for removing to some extent the oily substance contained in this spent clay, but the amount that can be removed is very slight—50 percent of the oily substance still remaining in the spent clay even after the steaming operation. Furthermore, the recovered oily substance is deteriorated during the steaming operation and, accordingly, cannot be recovered as refined oil. For resolving these problems, a refining method as by means of hydrogenation is also being employed in the petroleum industry but, as yet, no method is completely satisfactory.

An inexpensive refining agent which can carry out the refining operation of oily substances, for example, the decolorization, dehydration and deacidification operations, continuously without the necessity for a complicated filtration operation, and moreover at a high recovery ratio of the refined oil, and whose decolorizing, dehydrating and deacidifying capacities compare favorably with activated clay has not been known to date.

It has now been found that small aggregates of an acid-treated clay having a specified specific surface area and a pore volume as hereinafter specified has a refining capacity comparable to that of the known powdery activated clay and also that when this refining agent is used in refining oily substances, refined oily substances can be recovered in good yield without the shortcomings of the hereinbefore described known activated clay.

It was heretofore regarded that the activated clay used in the decolorization of oily substances such as mineral oils and fats had to be a powder of greatest possible fineness for achieving an intimate contact between the clay and the oily substances as well as for accomplishing its effective utilization. Hence, since the activated clay of granular or small aggregate form could not achieve an intimate contact with the oily substances nor could be effectively utilized in such a form, it was considered by the manufacturers as well as users of activated clay that fully satisfactory refining operations of oily substances, such as their decolorization, could not possibly be hoped for in the case of activated clay of above-noted form.

However, it has been found that when clay consisting predominantly of the montmorillonitic clay was treated by the method to be fully described hereinafter the acid-treated product was structurally stabilized in a state where it contained numerous pores to form configurationally stable granules or small aggregates of acid-treated clay whose pore volume was great and having new properties. These small aggregates of acid-treated clay, in direct opposition to the common knowledge concerning activated clay, had refining effects, such as the ability to decolorize oily substances, which was not inferior to that of the finely divided activated clay. Further, since not only the refining operations of oily substances could be carried out more easily when this acid-treated clay of granular or small aggregate form was used than when the finely divided activated clay was used but also the amount of oily substances remaining in the spent product was less, the ratio of recovery of the refined oily substances was also greater.

According to the present invention, a refining agent for oily substances is provided, which comprises granules or small aggregates of an acid-treated product of clay consisting predominantly of montmorillonite having a specific surface area of at least 120 m²/g and a pore volume of at least 0.7 ml/g, the pore volume being defined by the equation $$\rho = (1/d_1) - (1/d_2) \tag{1}$$

wherein $d_1$ is the apparent density of the small aggregate, $d_2$ is the true density of the acid-treated product of clay which is predominantly montmorillonite, and $\rho$ is the pore volume.

It is to be understood that the term "small aggregates", as hereinafter to be used in this specification, is meant to include granules also.

In the refining agent of the present invention, it is necessary that the acid-treated product of clay predominantly of montmorillonite be one whose specific surface area is at least 120 m²/g. Acid-treated products of clay that are useful in the refining agent include the acid-treated products of clay which have been heretofore used as starting material of activated clay such as the dioctahedral type montmorillonitic clay as bentonite, sub-bentonite and acid clay or such dioctahedral type montmorillonitic clay which has been partly incorporated with a kaolinite type clay such as halloysite.

The term "clay predominantly of montmorillonitic clay", as used herein, is meant to be not only the predominantly montmorillonitic native clay which contains in part a kaolinite type clay such as halloysite but also a clay mixture consisting of a major amount of montmorillonitic clay and a minor amount of kaolinite type clay such as halloysite. In general, it is preferred that the montmorillonitic clay is present in an amount of at least 50 percent by weight, and particularly above 80 percent by weight, of the total clay. From the standpoint of the capacity of refining the oily substances, ready availability and ease of handling, small aggregates of the acid-treated product of Japanese acid clay are preferred. Although differing depending upon the class of the clay and whether or not the clay has undergone the acid treatment or the extent of the acid treatment, generally speaking, the refining agent especially suitable for the purpose of the present invention is one having the following composition:

| | |
|---|---|
| $SiO_2$ | 70 – 85% (weight) |
| $Al_2O_3$ | 6 – 13% |
| FeO and $Fe_2O_3$ | 0.1 – 5% |
| MgO | 0.1 – 3% |
| CaO | 0.1 – 5% |
| Ignition loss | 3 – 9% |

The invention refining agent of small aggregate form is preferably one composed of an acid-treated product of clay which, when tested by the hereinafter given test procedure in a powdered state of a particle size of the order of 100 Tyler mesh, demonstrates a decolorization ratio of at least 80.0 percent, and particularly above 85.0 percent, as calculated from the light ray transmission at a wavelength of 500 m$\mu$ of the decolorized oil obtained by treating at 110 ± 5°C. for 20 minutes beef tallow to which has been added 3 percent thereof of the refining agent.

The invention refining agent must possess a specific surface area of at least 120 m$^2$/g. The specific surface area can be measured by a known method as follows.

Method of measuring the specific surface area.

After thorough grinding of the specimen and drying for 3 hours at 150°C., 1 gram of the specimen is carefully weighed and placed in a stopper equipped test tube to be used with a centrifuge, to which is then added 2 ml of a solvent mixture consisting of 30 parts by volume of dehydrated toluene and 70 parts by weight of a dehydrated isooctane. This is followed by shaking the test tube for 40 minutes with a horizontal shaker to cause adsorption of the solvent, after which the supernatant liquid is separated by centrifuging. The refractive index of the supernatant liquid is measured with the Abbe refractometer (Model PRA-B manufactured by Hitachi, Ltd.) using a sodium lamp as the light source. The aromatic adsorption index (AAI) is then calculated from the difference in the refractive indices of the supernatant liquid and the original solvent mixture and thereafter the specific surface area is obtained from the conversion table. [Pratt. T. W. Proc. 27th Annual Meeting, Am. Detr. Inst. (1947)]

When the specific surface area of the acid-treated product of clay which is predominantly montmorillonite is less than 120 m$^2$/g, its refining capacity, e.g. decolorization capacity, is small and difficulty is involved in carrying out the refining operation to satisfaction. While the specific surface area of acid-treated product of clay which is predominantly montmorillonite will vary in this invention depending upon the end to be achieved by the refining operation, the generally preferred range is 130 – 310 m$^2$/g. For example, that of a specific surface area of 220 – 310 m$^2$/g is preferred for decolorizing oils and fats and that of a specific surface area of 130 – 250 m$^2$/g is preferred in the case mineral oils are to be decolorized. On the other hand, one having a specific surface area of 120 – 310 m$^2$/g is to be preferred for dehydration or deacidification of fats and oils as well as mineral oils.

An important feature of the invention refining agent resides in the fact that the granules or small aggregates of the acid-treated product of clay consisting predominantly of montmorillonite have a pore volume of at least 0.7 ml/g, and preferably above 0.8 ml/g. The term "pore volume", as here used, is, as indicated by the hereinbefore given equation I, a value calculated from the difference between the reciprocal of the apparent density of the small aggregates and the reciprocal of the true density of the acid-treated product of clay consisting predominantly of montmorillonite. The apparent and true densities of the granules or small aggregates can be measured by known methods, the pore volume, as used herein, being measured as follows.

Method of measuring the pore volume.

After drying a sampling of the small aggregates for 3 hours at 150°C. a fixed amount (e.g. about 2 grams) of the specimen of small aggregates is taken and carefully weighed. The weighed specimen of small aggregates is then placed in a test tube which contains a fixed amount of a powder (e.g. about 10 grams of finely divided silica or alumina, or finely divided activated clay of 200 Tyler mesh) of a fixed particle size and fixed packing density to measure the packing density. After having buried the weighed small aggregates in the powder, the packed volume of the powder with the small aggregates embedded therein is measured by the customary technique of measuring the packing density of powder. The increase in volume obtained by subtracting the packed volume before introduction of the small aggregates from the packed volume containing the small aggregates is designated the volume of the small aggregates. The apparent density ($d_1$) is calculated from the foregoing measured value. On the other hand, the true density ($d_2$) is obtained in customary manner from the powdered product of the small aggregates. The pore volume ($\rho$) is then calculated by substitution in the equation $\rho = (1/d_1) - (1/d_2)$. As an alternative method, the volume of the small aggregates can be measured by a method of microscopically determining the dimensions of the small aggregates of fixed form, e.g. cylindrical or spherical aggregates, and obtaining an approximate value of the volume of the small aggregates from the foregoing dimensions.

The true density ($d_2$) of the acid-treated product of clay consisting predominantly of montmorillonite generally ranges from 2.2 – 2.7 g/ml although varying depending upon the class of clay and the acid-treating conditions. Consequently, it is preferred that the invention refining agent have an apparent density of generally not greater than 1.0 g/ml, and particularly one ranging from 0.5 – 0.9 g/ml.

As indicated by the fact that the pore volume of the invention refining agent is at least 0.7 ml/g, the inside of small aggregates are full of small holes or passages. As a result of these numerous small holes and passages inside the small aggregates, the invention refining agent has a capacity for refining oily substance which is not inferior to that of the powdered form of activated clay. When the pore volume of the small aggregates is less than 0.7 ml/g, its oily substance refining capacity becomes considerably inferior to that of powdered activated clay, and hence it is of no practical use. As the pore volume of the small aggregates becomes greater, their oily substance refining capacity tends to become greater. On the other hand, when the pore volume becomes too great, there is a tendency to a decline in the small aggregates' ability to retain its form. In consideration of these points, it is most preferred that use be made of small aggregates having a pore volume ranging from 0.8 - 1.6 ml/g. However, it is to be noted that small aggregates of relatively small pore volume can be used for the dehydration or deacidification of oily substances.

For making activated clay into small aggregates which are readily handled, the formation of the activated clay into small aggregates of tablet or cylindrical form by molding the as-available activated clay powder or after using a suitable binder is conceivable, but it was found that, as compared with the powder of activated clay, such molded products were exceedingly poor with respect to their properties such as their capacity of decolorizing the oily substances. While the powder of activated clay possesses in itself adequate capacity of decolorizing oily substances, in the case of the small aggregates obtained therefrom by molding the as-available powder or after the addition of a binder substance, only the surface portion of the small aggregates contributes to the refining of the oily substances and none of the clay particles present in the inner portion of the small aggregates are utilized. In fact, a sectional electron microscope photograph of this type of molded product reveals that the inside of the small aggregates are not full of small holes or passages and their pore volume is usually an extremely small value of merely 0.6 ml/g at most. Thus, for retaining intact the excellent refining capacity of acid-treated clay and for preparing a refining agent in the easily handled small aggregate form, it is necessary that the pore volume within the small aggregates be made at least 0.7 ml/g.

Further, of the total pore volume of the refining agent of small aggregate form, the pore volume of minute pores of diameter 0.02 - 10 microns ($\rho'$ ml/g) can be directly obtained from the volume that can be obtained from the cumulative minute pore distribution curve in the range of minute pores of diameters 10 microns to 0.02 micron of a high pressure mercury porosimeter. It is preferred that the ratio of the pore volume of pores of diameters 0.02 - 10 microns (ml/g) to the total pore volume (ml/g) i.e., $R (\%) = \rho'/\rho \times 100$ is in a range 35 - 75 percent in the case of the refining agent of small aggregate form of the present invention. When the R is within the above-indicated range, a desirable balance is obtained between those passages of relatively large diameter necessary for the diffusion of the impurities of oily substances and the minute pores necessary for refining the oily substances.

The small aggregates of the present invention may be of any form such as a spheroidal, cylindrical, granular, cubic, tubular or amorphous mass. The average particle diameter of the small aggregates is not restricted unqualifiedly, but may also vary depending upon the viscosity of the oily substance that is to be treated. However, from the standpoint of the ease of handling and efficiency of contact of the refining agent and the oily substance, a diameter of 0.1 - 5 mm, and particularly 0.2 - 1.2 mm, is preferred.

The new refining agent of the present invention can be prepared by the following dry acid-treatment method. Clay consisting predominantly of montmorillonite which contains acid-soluble basic constituents is intimately contacted with 0.3 to 1.0 equivalent, and particularly 0.4 - 0.9 equivalent, based on the total basic constituents, of an acid or its aqueous solution such that the ratio of clay to acid or its aqueous solution becomes one part by weight of the former to 0.3 - 2.5 parts by weight of the latter, on a dry basis of the clay, to directly form a plastic or solid reaction product. The so obtained reaction product is then treated in an aqueous medium having a pH of 1 or less to extract and remove the basic metallic constituents contained in the reaction product. As the material clay, the dioctahedral type montmorillonitic clays such as bentonite, subbentonite and acid clay or the montmorillonitic clay partly containing kaolinite such as halloysite are useable. It goes without saying, that these clay minerals can be submitted to a pretreatment such as levigation to remove the intermingled earth and sand. As the acid, the mineral acids such as sulfuric, hydrochloric and nitric acids, or the organic acids such as oxalic and acetic acids may be used, but preferred is sulfuric acid. The amounts of the basic metallic constituents to be removed from the material clay will vary depending upon the use to which the refining agent is to be put. Generally speaking, in case an acid or its aqueous solution is used in an amount of 0.2 to 0.6 equivalent of the basic metallic constituents, an activated clay suitable for use at high temperatures for refining petroleum lubricants and the like is obtained, and in case an acid or its aqueous solution is used in an amount of 0.5 to 1.0 equivalent, an activated clay suitable for use at low temperatures for refining oils and fats is obtained. When the liquid ratio of the clay to the acid or its aqueous solution is maintained in the range previously indicated, the mixture is obtained in a solid or creamy state. When this is maintained at a temperature of 60 - 300°C. and dried, if necessary, it is converted to a plastic or solid reaction product. The soluble basic constituents contained in the reaction product are extracted by treating the reaction product in an aqueous medium of a pH 1 or less, and preferably 0.5 or less, followed, if necessary, by drying. When the liquid ratio of the aforesaid clay to the acid or its aqueous solution is small, there are instances in which the reaction product itself is obtained in small aggregate form and hence the extracted activated clay is also ob-tained in small aggregate form. Further, the acid-treated clay can be obtained as small aggregates by preforming the mixture of the clay and acid or its aqueous solution into small aggregates of cylindrical, spheroidal, tablet, granular or cubic form by such means as extrusion molding, tabletting, spray-drying or molding in accordance with the con-dition of the mixture. The so obtained small aggregates of acid-treated clay are used either in their as-obtained state as the refining agent or after being roughly ground into particles of 0.1 - 5 mm size, as previously indicated, followed by screening, if necessary.

That these small aggregates of acid treated clay which have been prepared in this manner by the dry acid-treatment method possess a pore volume of above 0.7 ml/g as previously noted and, in addition, possess excellent form retainability which is truly surprising. The reason why the small aggregates of acid-treated clay formed in this manner, while possessing a great pore volume, still excel in their form retainability is not fully known as yet, but it is believed to be due to the fact that the reaction between the basic metallic constituents of the material clay and the acid is carried out under such conditions as to form a dry solid product, after which the extraction of the reacted basic metallic constituents is carried out.

The reason why the small aggregates of acid-treated clay prepared in this manner exhibit an unexpected pore volume and moreover possess numerous pores is believed to be due to the fact in the process of adding sulfuric acid to the finely divided material clay in an amount equivalent to the basic constituents to be removed and mixing in the presence of a fixed amount of moisture, granulating the so obtained plastic mixture and thereafter effecting the heat treatment of the granules, the sulfuric acid concentration of the granules rises as the heat treatment proceeds, and concurrently the formation of the sulfates of the basic constituents proceeds, and further the crystallization of the so formed salts proceeds whereby the granules are structurally stabilized in a state wherein these acid-soluble salts are incorporated intact in the acid-treated product uniformly dispersed therein. Thus, since the framework of the acid-treated product is stabilized in a state where its shrinkage has been hampered, the acid-treated clay, upon removal of the resulting salts therefrom by means of acid or its aqueous solution, is obtained in a porous aggregate form that cannot possibly have been foreseen by the hitherto held concept.

The invention refining agent of small aggregate form can also be prepared by the following different method. A powdered product of acid clay having a specific surface area of at least 120 m²/g is used and 5 – 50 percent by weight, and preferably 20 – 40 percent by weight, thereof of an inorganic salt, which is soluble in acid or its aqueous solution, for example, a sulfate such as sodium sulfate, ammonium sulfate or aluminum sulfate, is kneaded with the powdered acid-treated clay in the presence of water or an aqueous acid solution. The liquid weight ratio preferred when mixing the inorganic salts with the acid-treated clay is one in which the acid or its aqueous solution becomes 0.3 to 2.5 parts by weight based on 1 part by weight of the dried clay. The so kneaded mixture is either premolded into small aggregates of a size such as will yield a final average particle diameter of 0.1 – 5 mm or is molded into small aggregates of such a size while heating them to a temperature of 100 – 300°C. to form aggregates of clay consisting predominantly of montmoril-lonite in whose interior the soluble inorganic salt has been uniformly dispersed. These aggregates are then dipped in water or aqueous acid solution to lixiviate the soluble inorganic salts contained in the aggregates to yield the refining agent of small aggregate form of the present invention.

Further, a method wherein the previously described dry activation technique and this aggregation technique are combined i.e., a method comprising using as the starting material either clay consisting predominantly of montmorillonite whose specific surface area becomes at least 120 m²/g by means of acid treatment or the intermediate acid-treated product, mixing therewith a soluble inorganic salt and an aqueous solution of a mineral acid and granulating the so obtained mixture to thus prepare the invention refining agent of small aggregate form, will also be apparent to those skilled in the art.

For the purpose of improving the compression strength of the small aggregate-like refining agent, a binder such, for example, as sodium silicate, silica sol and silica-alumina sol may be added to either the material clay or the acid-treated clay in a small quantity of the order of 0.5 – 7 percent by weight of the total weight.

It has been found that in preparing the above mentioned granular or small aggregate-like refining agent, if an inorganic solid substance insoluble in either water or an acid is dispersed in a matrix of the acid-treated clay, the pore volume of the resulting small aggregate-like refining agent is substantially increased and, accordingly, the activity of the refining agent for refining oily substances is greatly promoted.

According to this invention, there is further provided a refining agent for oily substances comprising integrated small aggregates consisting of a matrix of an acid-treated product of clay consisting predominantly of montmorillonite and dispersed therein, a pore-constituting material consisting of an inorganic solid substance insoluble in either water of an acid, such small aggregates having a specific surface area of at least 120 square meters per gram and a pore volume of at least 0.7 milliliter per gram, such pore volume being defined by the equation:

$$\rho = (1/d_1) - (1/d_2)$$

wherein $d_1$ is the apparent density of the small aggregates, $d_2$ is the true density of the acid-treated product of montmorillonitic clay, and $\rho$ is the pore volume in milliliters per gram.

Any inorganic solid substance can be used in the present invention as the pore-constituting material as long as it is insoluble in either water or an acid. As preferable examples of the pore-constituting material there are cited anhydrous silicic acids such as a hydrogel and xerogel of silica, siliceous sand, quartz sand and diatomaceous earth; silicates insoluble in either water or an acid such as aluminum silicate, magnesium silicate, calcium silicate, kaolin, talc, asbestos, glass, slags, fly ash, rock wool and silicon phosphate; alumina such as α-alumina and γ-alumina; titanium compounds insoluble in either water or an acid such as titanium oxide and titanium phosphate; carbonaceous substances such as active carbon and graphite; and water-insoluble sulfates such as anhydrous gypsum and barium sulfate.

Such pore-constituting materials are used, for instance, in the form of a particle having a diameter of 0.1 – 1000 μ or of a short fiber. It is preferable that the pore-constituting material is present in an amount of 0.5 to 20 percent by weight based on the total weight of the small aggregates. In case the amount of the pore-constituting material is less than 0.5 percent by weight, a substantial increase of the pore volume cannot be expected. On the other hand, in case the pore-constituting material is used in an amount exceeding the upper limit of 20 percent by weight, the form-retaining ability of the small aggregates is lowered.

The invention refining agent of this type is prepared in accordance with the same method as described above except that prior to, or coincidendally with, the contact of the clay predominantly of montmorillonite and containing acid-soluble basic constituents with a mineral acid, a water-insoluble inorganic substance substantially non-reactive with mineral acid is incorporated in the above clay in an amount such that the inorganic substance will occupy 0.5 to 20 percent by weight of the resulting product.

The reason why in the above embodiment the pore volume is increased when the above mentioned pore-constituting material is dispersed in the matrix of the acid-treated clay and they are integrated into small aggregates has not been clearly elucidated. The solid substance dispersed in the matrix of the acid-treated clay is considered a type of filler. However, a substance such as glass, for instance, does not by itself have a high specific area or a high pore volume suitable for refining oily substances. Nevertheless, when the glass is incorporated in the matrix of the acid-treated clay, a substantial increase of the pore volume, which is clearly demonstrated in examples given hereinbelow is observed. Accordingly, it is evident that the increase of the pore volume in the refining agent of the present invention is due to the fact that the inorganic solid substance is contained as a member of a heterogeneous phase.

In this embodiment, the pore volume of the refining agent can be substantially increased by incorporating beforehand in the matrix of the acid-treated clay a pore-constituting material of an inorganic solid substance, and at the same time the average particle size of the refining agent can be increased, resulting in promotion of the ability of decolorizing oily substances.

Further, the use of the pore-constituting material which is heterogeneous to the acid-treated clay, such as silica gel, active carbon and titanium phosphate gel, results in another advantage that the refining agent can be provided with other useful properties such as property of dehydration, ability of adsorbing non-polar coloring substances and ability of adsorbing metallic impurities.

If the invention small aggregate-like refining agent possesses in itself form retainability, it does not necessarily need to possess great compression strength. It was found that the compression strength of the invention small aggregate-like refining agent was rather augmented during the operation of refining the oily substances. For example, the cylindrical-shaped refining agent, which demonstrates a compression strength of 4 – 5 kg before use, demonstrates a compression strength of 8 – 10 kg after immersion for 10 minutes in oils or fats of about 100°C., thus exhibiting a pronounced increase in its compression strength. Hence, the invention small aggregate-like refining agent makes it possible to employ a continuous refining operation, using either a moving or fluidized bed in treating the oily substances. In addition, the operations of charging and discharging the refining agent is made much easier.

The present invention provides a process for refining oily substances which comprises contacting the oily substances with small aggregates of acid-treated product of clay consisting predominantly of montmorillonite having a specific surface area of at least 120 m²/g and a pore volume of at least 0.7 ml/g, the pore volume being defined by the equation $$\rho = (1/d_1) - (1/d_2)$$

wherein $d_1$ is the apparent density of the small aggregates, $d_2$ is the true density of the acid-treated product of montmorillonitic clay, and $\rho$ is the pore volume (ml/g).

The invention small aggregate-like refining agent can be used for such refining operations as decolorization, dehydration and deacidification of various kinds of oily substances.

The oily substances for which the invention refining agent can be used include the various animal oils and fats such, for example, the fish oils such as squid oil, sardine oil, Lockington oil, herring oil, flat-fish oil, aburazame shark oil, cod liver oil, pollack liver oil and kurokozame liver oil; whale oils such as spermwhale oil, rorqual oil, sea whale liver oil and pilot whale brain oil; and beef tallow, neat's foot oil, lard, hog grease, mutton tallow, wool grease and beeswax; the various vegetable oils and fats such, for example, as linseed oil, nettle oil, olive oil, kapok oil, mustard oil, carnauba wax, tung oil, rice bran oil, sesame oil, soybean oil, camellia oil, rapeseed oil, palm oil, castor oil, cottonseed oil, Japanese wax, coconut oil and peanut oil; and the hardened oils of the foregoing vegetable oils; the various crude fatty acids such, for example, as lauric acid, myristic acid, palmitic acid, stearic acid, linolic acid and linolenic acid; the various plasticizers such, for example, as DOP, DOA and chlorinated paraffin; and the various petroleum products such, for example, as kerosene, gas oil, fuel oil, lubricating oils, paraffin wax and vaseline.

While the amount of the refining agent used for refining the oily substances will vary depending upon such, for example, as the object of the refining, the degree of refining, and the amount of impurities to be removed from the feed stock oily substance, generally speaking, the refining agent can be used in an amount of 0.5 – 7 percent by weight of the feed stock oily substance. The amount of the refining agent suitably used for the various refining purposes are as follows:

| | |
|---|---|
| Decoloration of oils and fats | 0.5 – 5 wt. % |
| Decoloration of mineral oils | 1 – 5 wt. % |
| Dehydration of oils and fats and mineral oils | 0.5 – 3 wt. % |
| Deacidification of mineral oils | 1 – 5 wt. % |

The refining of oily substances can be readily carried out by contacting the oily substances in the liquid phase with the invention small aggregate-like refining agent. Furthermore, a filtration operation is not necessary in separating the refined oil from the refining agent as in the case with the conventional activated clay. Hence, the process of refining oily substances is efficient and savings occur in labor cost. The contact of the small aggregate-like refining agent with the oily substance can be carried out by utilizing known procedures. For example, the contact of the small aggregate-like refining agent and the oily substance can be had either by holding the former and the latter in a vessel for a prescribed period of time at a prescribed temperature, or by passing the oily substance through a fixed, moving or fluidized bed of the invention small aggregate-like refining agent. Needless to say, the refining process can be made completely continuous by introducing a fresh or regenerated small aggregate-like refining agent from one part of the apparatus and discharging the spent small aggregate-like refining agent from another part of the apparatus.

While the packing density of small aggregates usually depends upon their shape and dimensions, generally speaking, the small aggregate-like refining agent of the present invention can be used with a packing density of 0.3 – 0.7 g/ml. The packing density and the particle size that are convenient for the individual oily substances can be readily determined by those skilled in the art by a simple experient relative to the viscosity of the oily substances at the temperature at which the refining treatment is carried out.

The temperature and time to be used at the time when the small aggregate-like refining agent and the oily substances are contacted are those which per se are known, i.e., they may be the same as those used in the conventional method of using a powder of activated clay, the only requirement being that it is a temperature which is sufficient such as to enable the oily substance to pass through the layer of the small aggregate-like refining agent and lower than the temperature which decomposes the oily substance. The ranges of temperature which are generally suitable for the several refining operations are as follows:

| | |
|---|---|
| Decolorization of oils and fats | 70 – 130°C. |
| Decolorization of mineral oils | 120 – 300°C. |
| Dehydration of oils and fats | 20 – 60°C. |
| Dehydration of mineral oils | 10 – 60°C. |
| Deacidification of mineral oils | 120 – 180°c. |

Since the invention refining agent is of small aggregate form, no special operations for separating the refined oil from the refining agent are required at all. Hence, the complicated and troublesome filtration step which was required in the case of the conventional method of using powdered activated clay is not necessary.

Further, in the conventional method which uses powdered activated clay, it was only possible to recover at most 90 percent of the oily substance as refined oil. On the other hand, when the invention small aggregate-like refining agent is used, above 99 percent of the oily substance can be recovered as refined oil. As a result, the content of oily substance in the spent small aggregate-like refining agent of the present invention is an exceedingly small amount as compared with the case of the conventional spent activated clay.

Further, since the spent invention small aggregate-like refining agent is of small aggregate form, its after-treatment is also simple. For example, the oily substance contained in the refining agent can be completely driven out and recovered readily by the use of such solvents as n-hexane, kerosene and alcohols. This oily substance which has been recovered by extracting with a solvent, differing from the conventional treatment by means of such as steaming, can be recovered as refined oil without deterioration of the oil. In addition, the oily substance that remains in the spent clay after this solvent extraction is an extremely small amount of not more than 0.1 percent. Thus, when compared with the fact that in the past the spent clay was disposed with 50 percent of oil remaining, it can be seen that the invention refining agent is exceedingly economical since by its use the loss of oily substance can be greatly reduced. Furthermore, this spent clay of aggregate form which contains practically no oily substance can be disposed without fear of causing any pollution problems.

The present invention will be further illustrated by means of the following examples.

Example I

This example illustrates a method of decolorizing and refining beef tallow by passing the beef tallow through a packed layer of small aggregate-like activated clay which was prepared by the dry acid treatment technique.

A. Preparation of the small aggregate-like activated clay by the dry acid treatment method.

As the starting montmorillonitic clay (hereinafter referred to as starting clay), the Japanese acid clay, a montmorillonitic clay, produced at Kamigo, Tsuruoka, Yamagata Prefecture, Japan was chosen. This starting clay will be referred to as starting clay A.

Starting clay A contains 46.0 percent free moisture and upon analysis contains the following principal constituents:

| | |
|---|---|
| $SiO_2$ | 57.73 (wt. %) |
| $Al_2O_3$ | 22.80 |
| FeO | 1.48 |
| $Fe_2O_3$ | 6.81 |
| MgO | 4.50 |
| CaO | 0.23 |
| Ignition loss | 7.30 |

Water is added to this free moisture-containing starting clay A and ground, followed by separating the earth and sand contained by sieving in water to yield a purified clay slurry from which the clay particles are precipitated by adding milk of lime, after which the water is separated and the particles are dried, adjusting the moisture content to 45 percent. 104 Grams of concentrated sulfuric acid of 98 percent concentration are added to 300 grams of this purified starting clay A and intimately commingled. The amount of sulfuric acid added at this time corresponds to about 0.7 chemical reaction equivalent (hereinafter referred to as equivalent) of the total basic metallic constituents contained in the starting clay A. What is here referred to as the total basic metallic constituents is meant to be such basic metallic constituents as aluminum, iron, magnesium and calcium that are contained in the clay. In this case, the valence of the metals are considered; for example, in the case of the iron constituent, it is considered as bivalent or trivalent on the basis of the state in which it is contained in the starting clay.

The starting clay particles and the acid of the obtained plastic blend are thoroughly brought into intimate contact with each other, using a kneading granulator (a commercial meat grinder), after which the blend is formed into cylindrical granules 0.5 mm in diameter and about 3 – 7 mm in length. The liquid weight ratio of the blend granulated at this time corresponds to 1 part by weight of the dried clay to 1.43 parts by weight of the aqueous acid solution. Small aggregates of cylindrical form of suitable hardness are granulated when the kneading and granulation operation are carried out with this liquid weight ratio of 1.43.

Three hundred grams of this granular blend is placed in a vessel consisting of a hard glass tube bottomed with wire netting whose diameter is 6.5 cm and height is 17 cm. This container is kept still for 2 hours in an air-bathed constant temperature tank of 150°C. to cause the reaction to proceed to thus obtain a solid cylindrical product which produces a rustling sound when stirred by hand.

This is then followed by charging the so obtained solid cylindrical product in an extraction apparatus where the separation by extraction of the reacted soluble sulfate is carried out. As the extraction apparatus, an extraction column consisting of a hard glass tube 4 cm in diameter and 30 cm high and having a perforated plate disposed at a point 10 cm from the bottom of the glass tube is used. This extraction column is filled with sulfuric acid solution of pH 0.5 as the aqueous extracting medium and the temperature of this aqueous medium is maintained at 80°C. A part of the aforesaid solid cylindrical product is introduced into this aqueous medium atop the perforated plate and allowed to stand for one hour. The soluble salts formed by this operation are eluted, and since the eluted salts have specific gravities which are greater than that of the sulfuric acid solution, they settle to the bottom of the column and accumulate. Sulfuric acid solution of pH 0.5 is poured from the top of the column into the soluble salts collected at the bottom of the column at the rate of 20 ml per minute and an equal amount is withdrawn from the bottom of the column. When this operation is continued, the reacted salts of the basic constituents are recovered at a high concentration. This recovered liquid contains 11.5 percent of alumina (as $Al_2O_3$), and when this is cooled, it solidifies to produce a solid iron-containing aluminum sulfate. This is further washed with sulfuric acid solution of pH 0.5 and thereafter water-washed. The aggregates retain their aggregate form until completion of their water-washing without disintegrating into slurry form. When the aggregates whose water-washing has been completed are dried for one hour at 110°C., activated clay of cylindrical form whose average particle diameter is 0.3 ± 0.1 mm and whose treatment with 0.7 equivalent of acid has been completed is obtained.

The specific surface area and pore volume of the so obtained acid-treated cylindrical activated clay particles are determined in accordance with the procedures hereinbefore described with the results shown in Table I. At this time, by way comparison, the specific surface areas and pore volumes of two comparisons A and B were also likewise determined; comparison A being granular activated clay of about 0.5 – 0.3 mm in diameter which was obtained by the conventional wet granulation and activation method using the same starting clay A as in the case with the present example, and comparison B being granular activated clay of tablet form obtained by a method of tabletting powdered activated clay obtained by the slurry-state activation technique, into tablets about 1 mm in diameter. These results are also shown in Table I.

Further, for clarifying the meaning of pore volume, i.e. for finding out the distribution of the small passages and pores, and especially the distribution of the pores of 0.02 – 10 microns in the aggregate-like activated clay, the measurement of the pore diameters of the aggregate-like activated clay obtained and the hereinabove mentioned two comparisons are made using a high pressure mercury porosimeter of 1,000 kg/cm² (Aminco-Winslow Porosimeter). These results are also shown in Table I.

Further, as other properties of this aggregate-like activated clay, the average pore diameter, packing density and the acidity of the clay are measured, and these are also presented in Table I.

Method of calculating the average pore diameter.

The average pore diameter is calculated from the pore volume $\rho$(ml/g) fully described in a previous paragraph herein and the specific surface area S (m²/g) by means of the following equation:

$$D = [(5 \times \rho)/S] \times 10^4 \quad (A).$$

Method of measuring the packing density.

Five grams of the specimen of aggregate-like activated clay dried for 3 hours at 150°C. are weighed into a calibrated test tube for use with the packing density measurement apparatus (manufactured by Ishiyama Kagaku Kiki Seisakusho, Japan). After the packing of the specimen has been completed by shaking the tube for 20 minutes, the volume at this time is determined and the number of grams per unit volume is calculated.

Method of measuring the acidity of clay.

Five grams of the specimen aggregate-like activated clay are accurately weighed into a stopper-equiped calibrated test tube, to which is then added 50 ml of neutral 10 percent saline, after which the test tube is shaken for 30 minutes. At this time a similar operation as a blank test is carried out with 50 ml of water instead of the 10 percent saline. After shaking for 30 minutes, the contents are separated by filtration, following which the residue is washed in 50 ml of water. The filtrate and wash liquid are combined and titrated with a standard N/10 caustic soda solution using phenolphthalein as the indicator. The acidity of the clay is then calculated by means of the following equation:

$$\text{Clay acidity (meq/100g)} = (A - B) \times (1/10) \times F \times (100/5)$$

wherein:
A is the number of ml of the titrant added when treated with saline,
B is the number of ml of the titrant added when treated with water, and
F is the factor of the standard N/10 caustic soda solution.

B. The decolorization of beef tallow.

As the so-called fixed bed type packed layer for carrying out the decolorization of beef tallow by passing the same through a packed layer of aggregate-like activated clay, a vertical type packing column of hard glass 30 mm in diameter and 300 mm high was used whose outside was equipped with a jacket for passing a heating medium to make it possible either to heat the column or keep it warm, and in whose bottom a perforated plate was disposed to make possible the outflow of the liquid from the lower end thereof.

This packing column is packed with 30 grams of the aggregate-like activated clay of average particle diameter 0.3 ± 0.1 mm prepared as described in A, above, while the starting beef tallow heated at about 90°C. is flowed in from the lower end until the column is filled to a point about 5 cm above the packed layer of aggregates, while guarding against any bubbles remaining in the packed layer of the aggregate-like activated clay. On the other hand, the jacket surrounding the column is filled with silicone oil and heated so as to maintain the temperature of the oil in the packed layer at 110°C. ± 5°C.

Next, the starting beef tallow heated to about 90°C. is poured into the column from the top at the rate of 10 grams per minute while an equal amount is drawn from the lower end, thus recovering the decolorized beef tallow. A total of one liter is recovered. The amount of clay used based on the oil was 3 percent in this case. The ratio of decolorization of the so recovered refined oil was measured and the results obtained are shown in Table I.

Method of measuring the ratio of decolorization.

The degree of light absorption of the recovered oil which has been decolorized and the starting oil were determined from the light transmittance of the oils when light of wavelengths 420 m$\mu$ and 500 m$\mu$ were transmitted through the oils, using a spectrophotometer Model 101 (manufactured by Hitachi Limited) with 10 cm cell. In accordance with the Lambert-Beer's law, the difference in colorimetric concentration of impurities such as coloring matter was obtained from the so obtained value and the ratio of decolorization of the decolorized oil relative to the starting oil was obtained by means of the following equation:

$$D = \frac{\log \frac{1}{T'} - \log \frac{1}{T}}{\log \frac{1}{T'}} \times 100 \ (\%)$$

wherein:

$D$ is the ratio of decolorization (%), $T$ is the transmittance when the oil was refined and decolorized, and $T'$ is the transmittance of the starting oil.

Further, the acid value of the refined decolorized oil was also determined at this time. It is generally desired that the acid value of the oil does not rise during the refining process. The acid value obtained is also shown in Table I.

Method of measuring the acid value.

After weighing 1 gram of the specimen oil into a 200-ml Erlenmeyer flask, 50 ml of a neutral solvent (1:1 benzene-ethyl alcohol mixed solvent) is added, after which the titration is carried out using a standard alcoholic N/40 caustic potash solution with phenolphthalein as the indicator. The acid value is calculated by means of the following equation from the amount in ml of the titrant added.

Acid value = $56.11 \times A \times (1/40) \times F$ wherein:

$A$ is the amount added in ml of the standard alcoholic N/40 caustic potash solution, and $F$ is the factor of the standard N/40 caustic potash solution.

Further, the ratio of recovery of the oil during the decolorizing process is also obtained, which is also shown in Table I.

Method of measuring the ratio of recovery of oil.

The ratio of recovery of oil is obtained from the amount of starting oil poured into the packed column for refining and the amount of recovered oil which has passed through the packed column up until the completion of the refining operation and has been recovered. Further when the oil contained impregnated in the aggregate-like activated clay at this time is recovered by extraction with a solvent (e.g. n-hexane, etc.), this is added to the previously recovered oil and this amount is designated as the extracted recovery ratio. On the other hand, the oil that is finally retained impregnated in the aggregate-like activated clay is designated as the oil impregnated in the used clay and is indicated as percent content. By way of comparison, an oil recovery experiment was carried out using a powdered activated clay (Comparison C) which was obtained by comminution of the clay of the aforementioned Comparison A. The decolorization of beef tallow was carried out under otherwise identical conditions by the slurry-stirred batch method, after which the refined oil was separated by means of the suction filtration technique using filter paper to recover the refined oil. The ratio of recovery of refined oil in this case and the percent content of oil impregnated in the used clay are shown in Table I.

TABLE I

|  | Aggregate-like activated clay according to present invention | Comparison A | Comparison B | Comparison C |
|---|---|---|---|---|
| Specific surface area (m²/g) | 296 | 232 | 174 | 232 |
| Pore volume (ml/g) | 0.98 | 0.67 | 0.17 | — |
| Distribution of pores (ml/g): |  |  |  |  |
| Diameter 10 – 1 $\mu$ | 0.166 | 0.066 | 0.090 | — |
| 1 – 0.5 $\mu$ | 0.045 | 0.025 | 0.010 | — |
| 0.5 – 0.1 $\mu$ | 0.109 | 0.069 | 0.014 | — |
| 0.1 – 0.02 $\mu$ | 0.165 | 0.072 | 0.019 | — |
| Pore volume of pores 0.02 – 10 $\mu$ (ml/g) | 0.485 | 0.232 | 0.133 | — |
| Ratio of pores 0.02 – 10 $\mu$ in diameter to total pores (%) | 49.5 | 32.9 | 76.5 | — |
| Average pore diameter (A) | 165 | 149 | 49 | — |
| Packing Density (g/ml) | 0.51 | 0.62 | 0.83 | — |
| Acidity of clay (meq/100 g) | 9.38 | 10.67 | 1.00 | — |
| Decolorization ratio (%) |  |  |  |  |
| 420 m$\mu$ | 74.5 | 53.1 | 11.0 | 66.3 |
| 500 m$\mu$ | 97.7 | 66.2 | 32.0 | 75.8 |
| Acid value | 0.572 | 0.580 | — | 0.624 |
| Recovery of decolorized oil (%) | 97.9 | 96.5 | 98.2 | 89.5 |
| Extraction and recovery by means of n-hexane (%) | 99.1 | 98.7 | 99.0 | — |
| Oil contained impregnated in used clay (%) | 0.2 | — | — | 55.0 |
| State of used clay | rustling granular | rustling granular | rustling granular | sticky mayonnaise state |

From the results presented in the foregoing table it can be appreciated that when the decolorizing of beef tallow is carried out by passing it through a packed layer made up by using the small aggregate-like activated clay which has been prepared by the dry acid treatment method and having a specific surface area of at least 120 m²/g, a pore volume of at least 0.7 ml/g, and particularly in which the ratio of the pores whose diameters are 0.02 – 10 microns account for 35 – 75 percent of the total pore volume, the ratio of decolorization achieved excels that of the case where the powdered activated clay is used and moreover the ratio of decolorization demonstrated far exceeds that of the commercial granular product whose pore volume is small. In addition, with respect to the recovery of the oil it is a refining agent which simplifies the refining treatment of the oil contained in beef tallow, the ratio of recovery being a little more than about 10 percent higher than that of the powdered product. Further, the oil contained impregnated in the used clay is small, and hence it is easily disposed.

Example II

This example will illustrate the case where the decolorization of various classes of animal and vegetable oils have been carried out using a packed layer made up using the small aggregate-like activated clay.

The small aggregate-like activated clay used is one prepared in accordance with the method described in A of Example I and is of cylindrical shape of average particle diameter 0.3 ± 0.1 mm and having a specific surface area of 296 m²/g and pore volume of 0.98 ml/g. This aggregate-like activated clay is packed in a fixed bed type packed layer apparatus such as described in B of Example I, and the decolorization of the several oils and fats is carried out by operating as described in Example I.

As the oils and fats, six classes are chosen, namely, safflower, soybean, rice-bran and cottonseed oils, lard, and oil of small fish. The decolorization of each of these is carried out under the treatment conditions of a temperature of 110°C. ± 5°C., amount used of the activated clay based on the oil of 3 percent, and rate of passage of the oil through the packed layer of 10 grams per minute. The ratios of decolorization of the several oils are determined from the light transmittances of the starting oils and the refined recovered oils, while the ratios of recovery are determined from the amounts of refined oils recovered. The ratios of decolorization and recovery are also determined in the case where the decolorization of these oils is carried out by the slurry-stirred batch method under identical treatment conditions but using the powdered activated clay of Comparison C used in Example I. The results obtained in these experiments are shown in Table II.

It is seen from the foregoing results that the various classes of animal and vegetable oils and fats can be decolorized effectively with a high ratio of recovery by using as the refining agent the small aggregate-like activated clay having a large specific surface area as well as large pore volume.

Further, in the case where the powdered activated clay was used, a long period of 2 – 24 hours per liter of the refined oil under condition of application of heat (80 – 50°C.) was required for the filtration operation for separating the oily substance from the spent clay, but when the small aggregate-like activated clay of the present invention was used, there was no need at all for the filtration operation.

Example III

This example illustrates the case where the refining treatment of decolorization and deacidification is carried out on the various classes of mineral oils using a packed layer made up by using the small aggregate-like activated clay.

A. Preparation of the small aggregate-like activated clay.

As the starting clay, a purified starting clay A prepared to a moisture content of 45 percent obtained by using starting clay A and operating as described in A of Example I is chosen. Sixty grams of 98 percent sulfuric acid of about 0.4 equivalent of the total basic metallic constituents contained in 300 grams of the foregoing purified starting clay A is added to this clay and intimately blended therewith. The liquid weight ratio of the blend at this time is about 1.17, and when this is formed into cylindrical granules having a diameter of about 0.5 mm and a length of about 3 – 7 mm by the procedure described in Example I, the granulation of the blend into well-kneaded small cylindrical aggregates having a suitable hardness is accomplished. The resulting granules are then treated at 150°C. by operating as in Example I, the reacted soluble sulfates are separated by extraction, and the granular are dried, thereby obtaining activated clay particles of cylindrical shape having an average diameter of 0.3 ± 0.1 mm which have been acid-treated with 0.4 equivalent of sulfuric acid.

When the pore volume and specific surface area as well as the average pore diameter, packing density and the acidity of the so obtained small aggregate-like acid clay were measured, they were as follows:

| | |
|---|---|
| Pore volume (ml/g) | 0.77 |
| Specific surface area (m²/g) | 216 |
| Average pore diameter (A) | 178 |
| Packing density (g/ml) | 0.63 |
| Acidity of clay (meq/100 g) | 22.8 |

TABLE II

| Oil or Fat | Small Aggregate-like Activated Clay | | | Powdered Activated Clay | | |
|---|---|---|---|---|---|---|
| | Decolorization (%) | | Recovery (%) | Decolorization (%) | | Recovery (%) |
| | 420 mμ | 500 mμ | | 420 mμ | 500 mμ | |
| safflower oil | 73.3 | 96.7 | 97.5 | 70.3 | 96.2 | 89.5 |
| soybean oil | 77.8 | 98.8 | 97.5 | 75.4 | 98.0 | 89.0 |
| rice-bran oil | 49.0 | 90.0 | 97.0 | 43.5 | 80.8 | 88.5 |
| cottonseed oil | 62.9 | 78.5 | 97.5 | 57.7 | 71.5 | 89.5 |
| lard | 49.1 | 88.0 | 97.0 | 48.7 | 78.3 | 88.0 |
| small fish oil | 45.0 | 89.0 | 97.5 | 43.2 | 87.0 | 88.5 |

B. Decolorization and deacidification of mineral oils.

The decolorization is carried out using the small aggregate-like activated clay prepared in A which is prepared into a fixed bed type packed layer in accordance with the procedure described in B of Example I.

The two classes of lubricating oils, the motor oil type and the spindle oil type, separated from petroleum are chosen as the mineral oil. The acid values of these starting oils (after a partial alkali treatment) are 2.35 and 2.80, respectively. The decolorization of each of these starting oils is carried out under the treatment conditions of temperature 180°C ± 5°C., amount used of the activated clay based on the oil of 3 percent and rate of passage of the oil through the packed layer of 5 grams per minute. As in Example I, the ratio of decolorization is obtained from the light transmittance measured at 500 m$\mu$. Further, the recovery ratio and acid value are also determined as described in Example I. These results are shown in Table III. By way of comparison, the decolorization ratios and recovery ratios for the instance where the powdered activated clay obtained by the granular activation technique in accordance with the conventional wet method is used with the aforesaid two classes of oils (Comparison D) are also shown in Table III.

starting clay A is added to this clay and intimately blended therewith. This blend is then granulated, treated at 150°C. and prepared into activated clay particles of cylindrical shape having an average particle diameter of 0.3 ± 0.1 mm by operating as described in A of Example I.

The pore volume, specific surface area, average pore diameter, packing density and the acidity of the clay, when measured, are as follows:

| | |
|---|---|
| Pore volume (ml/g) | 1.39 |
| Specific surface area (m$^2$/g) | 304 |
| Average pore diameter (A) | 229 |
| Packing density (g/ml) | 0.50 |
| Acidity of clay (meq/100 g) | 8.13 |

B. The dehydration of moisture contained in light oils.

The dehydration is carried out employing the fixed bed type packed layer prepared by the method described in B of Example I using the small aggregate-like activated clay prepared in A.

As the starting light oils, two classes are chosen whose moisture contents are 757 and 1,934 ppm, respectively.

The measurement of the moisture content is carried

TABLE III

| Lubricating Oil | Small Aggregate-like Activated Clay | | | Powdered Activated Clay (Comparison D) | | |
|---|---|---|---|---|---|---|
| | Decolorization (%) (500 m$\mu$) | Recovery (%) | Acid Value of Refined Oil | Decolorization (%) (500 m$\mu$) | Recovery (%) | Acid Value of Refined Oil |
| motor oil type | 58.0 | 95.5 | 0.263 | 43.9 | 84.0 | 0.450 |
| spindle oil type | 75.8 | 96.5 | 0.240 | 71.6 | 86.5 | 0.440 |

It can be appreciated from the foregoing results that even at elevated temperatures (180°C ± 5°C) by the use of the small aggregate-like activated clay having a large specific surface area and a great pore volume the mineral oils also are decolorized more effectively than the case where the powdered activated clay is used. In addition, it is seen that refined oil whose deacidification effect is also superior is recovered at a high ratio without any special filtration operations.

Example IV

This example illustrates the instance where the dehydration of the moisture contained in light oils is carried out employing a packed layer prepared by using the small aggregate-like activated clay.

A. Preparation of the small aggregate-like activated clay.

As starting clay, a purified clay A adjusted to a moisture content of 45 percent is chosen. This clay is obtained by operating as described in A of Example I using clay A. 117 Grams of 98 percent sulfuric acid of about 0.8 equivalent of the total basic metallic constituents contained in 300 grams of the foregoing purified out by means of the Karl Fischer's method which utilizes the reaction between water and the Karl Fischer's reagent (a standard solution consisting of iodine, sulfur dioxide and pyridine dissolved in methanol).

The starting oils are passed through the aforementioned fixed bed type packed layer at room temperature (25°C.). By passing the oil through 20 grams of the activated clay (corresponding in volume to 40 ml of the packed layer) at a speed of one liter per hour in the case of the light oil whose moisture content is 757 ppm and 300 ml per hour in the case of the light oil whose moisture content is 1,934 ppm, the dehydration is carried out using 3 percent of the activated clay based on the starting oils. The moisture content of the refined oil recovered is determined and the amount of moisture removed from the starting oil is designated the dehydration rate. The results obtained are shown in Table IV.

At the same time, the dehydration operation is also carried out using the granular activated clays which were used in Comparisons A and B in Example I. The results obtained in this case are also shown in Table IV.

TABLE IV

| Moisture Content of Starting Oil (ppm) | Dehydration Ratio (%) | | |
|---|---|---|---|
| | Present Example | Comparison A | Comparison B |
| 757 | 14.58 | 12.19 | 10.90 |
| 1934 | 57.04 | 51.21 | 48.70 |

It thus can be appreciated from the foregoing results that in the case also of the dehydration of the moisture contained in the oily substances the use of the small aggregate-like activated clay having a large specific surface area and a great pore volume is effective.

Example V

This example illustrates the instances of the refining agents prepared using different classes of starting clay in preparing the small aggregate-like activated clay having a great pore volume.

Three classes of clays are chosen as the starting material. Chosen as clay B is a montmorillonitic acid clay produced in Nakajo, Kitakambara-gun, Niigata Prefecture, Japan. As clay C, a sub-bentonite, a montmorillonitic clay, produced in Cheto, U.S.A. is chosen. On the other hand, as clay D is chosen a mixed clay consisting of an intimate mixture of 60 parts by weight of clay A and 40 parts by weight of halloysite, a kaolin type clay, produced in Sanko, Kitakambara-gun, Niigata Prefecture, Japan. The analysis of the principal constituents of the dried products of these three classes of clay and their free moisture content are as indicated in Table V.

In preparing the small aggregate-like activated clay from clay B, the method described in A of Example I is followed. Namely, sulfuric acid in an amount of 0.7 equivalent of the total basic constituent contained in purified clay B is added to the clay and the kneading is carried out at a liquid weight ratio of 1.35. The kneaded mixture is granulated and then submitted to a dry heat treatment at 150°C. to obtain a solid product of cylindrical shape, from which the soluble sulfates formed by the reaction are extracted and separated, followed by water-washing and drying. Thus is obtained from clay B activated clay particles of cylindrical shape having an average particle diameter of 0.3 ± 0.1 mm.

In preparing the small aggregate-like activated clay from clay C, the method, identical to that described in A of Example I, is followed, which comprises adding to the clay sulfuric acid in an amount of 0.7 equivalent of the total basic constituents contained in purified clay C and kneading with a liquid weight ratio of 1.30, followed by granulation of the kneaded mixture, and thereafter submitting the resulting particles to a dry heat treatment at 150°C. to obtain a solid product of cylindrical shape. The soluble sulfate formed in the so obtained product is then extracted and separated, after which the product is water-washed and dried.

Thus from clay C activated clay particles of cylindrical shape having an average particle diameter of 0.3 ± 0.1 mm are obtained.

On the other hand, in the case of the preparation of the small aggregate-like activated clay from clay D, small aggregates cannot be obtained by employment of the dry sulfuric acid treatment, as described in A of Example I. Crumbling of the small aggregates occurs because of the content of halloysite in the mixed clay. Hence, in this case, a two-stage treatment method which consists in treating the basic constituents contained in the clay in two stages is carried out. That is to say, in the first stage sulfuric acid in an amount of 0.5 equivalent of the total basic constituents contained in the purified clay is added thereto and the mixture is kneaded, granulated and thereafter heat treated at 150°C. The soluble sulfates formed in the so obtained solid product of cylindrical shape are separated by extraction with dilute sulfuric acid solution in a slurried state to obtain an intermediate acid-treated product wherein about one half of the basic constituents contained in clay D has been acid-treated. After adjusting the moisture content of this intermediate acid-treated product to about 35 percent, sulfuric acid in an amount of 0.3 equivalent of the total basic constituents contained in clay D is added and kneading of the mixture is carried out with a liquid weight ratio of 1.10, followed by granulation of the mixture and heat treatment at 150°C., whereupon a small aggregate-like mixed product which does not break down even when introduced into water is obtained. Soluble sulfates are extracted and separated from this mixed product, using dilute sulfuric acid and water, followed by water-washing and drying, whereupon activated clay particles of cylindrical shape having an average particle diameter of 0.3 ± 0.1 mm, which have been treated with 0.8 equivalent of sulfuric acid by the two-stage acid treatment are obtained.

The specific surface areas, pore volumes, average pore diameters and packing densities of the small aggregate-like activated clay particles obtained by the dry acid treatment of the aforementioned three classes of clays are measured, the results being shown in Table V.

The three classes of small aggregate-like activated clay particles hereinabove obtained are used and each is prepared into a fixed bed type packed layer and the decolorization of beef tallow is carried out by operating as described in B of Example I and in accordance with the treatment conditions there indicated. The ratio of decolorization of the beef tallow and the ratio of recovery of the oil are determined, which results are also shown in Table V.

TABLE V

|  | Clay B of Present Invention | Clay C of Present Invention | Clay D of Present Invention |
| --- | --- | --- | --- |
| Principal constituents of dried clay (%) | | | |
| $SiO_2$ | 70.55 | 60.37 | 54.43 |
| $Al_2O_3$ | 14.52 | 24.83 | 27.31 |
| $Fe_2O_3$ (including FeO) | 3.37 | 2.74 | 5.28 |
| CaO | 0.83 | 2.66 | 2.32 |
| MgO | 5.57 | 3.22 | 0.89 |
| Ignition loss | 5.50 | 7.14 | 10.13 |
| Free moisture content of clay (%) | 42.0 | 35.5 | 37.0 |
| Specific surface area (m²/g) | 285 | 265 | 230 |
| Pore volume (ml/g) | 0.99 | 0.78 | 0.79 |
| Average pore diameter (A) | 174 | 150 | 170 |
| Packing density (g/ml) | 0.52 | 0.53 | 0.60 |
| Decolorization ratio (%) | | | |
| 420 (m$\mu$) | 52.2 | 51.4 | 50.3 |
| 500 (m$\mu$) | 92.1 | 91.6 | 90.5 |
| Recovery ratio (%) | 98.0 | 97.5 | 97.5 |

From the foregoing results it is seen that when the starting clays which contain in part either the montmorillonitic or kaolin type clay are acid treated choosing the treatment conditions which match the conditions of each of the starting clays small aggregate-like activated clay having not only a great specific surface area but also a high pore volume is obtained in all cases. When a fixed bed type packed layer is prepared with this small aggregate-like activated clay and the decolorization of beef tallow is carried out, the decolorization is accomplished effectively with a high ratio of recovery of the oil contained. Hence, it can be seen that the small aggregate-like activated clays prepared from the various aforementioned classes of clays with treatment conditions which match the clay in question are in all cases effective as a refining agent.

Example VI

This example describes two classes of purification agents in which the compression strength of the small aggregates have been increased in two ways in preparing the small aggregate-like activated clay.

A. The preparation of the small aggregate-like activated clay using a two-stage dry-and-wet combination acid treatment.

Clay A is chosen as the starting material. As in the method described in A of Example I, to the clay A is added sulfuric acid in an amount of 0.6 equivalent of the total basic constituents contained in the purified clay A, and the mixture is kneaded at a liquid weight ratio of 1.30, then granulated and thereafter submitted to a dry heat treatment at 150°C. to obtain a solid product of cylindrical shape. After extraction and separation of the reaction-formed soluble sulfates from this product, it is water-washed. Rustling water-washed activated clay particles of cylindrical shape having an average particle diameter of 0.4 ± 0.1 mm are obtained.

Three grams of the so obtained rustling water-washed activated clay particles of cylindrical shape are placed in a 1-liter beaker. The basic constituents remaining unreacted by the dry acid treatment (0.4 equivalent of the total basic constituents remain unreacted in the water-washed activated clay particles of cylindrical shape obtained by the dry acid treatment) are submitted to a sulfuric acid treatment by the wet technique by heating the activated clay placed in the beaker for about two hours at 80 – 90°C. using 600 ml of 20 wt. % sulfuric acid solution. This is followed by water-washing and drying of the acid-treated activated clay to obtain without crumbling small aggregate-like activated clay particles of average particle diameter 0.3 ± 0.1 mm.

The specific surface area, pore volume and compression strength under load of the so obtained small aggregate-like activated clay are measured, the results being shown in Table VI.

Method of measuring the compression strength.

The conventional loaded compression strength testing machine consisting of a pair of parallel iron plates between which the granular product to be tested is placed is used. One particle of the dried specimen of the small aggregate-like activated clay to be tested is placed between the pair of iron plates and pressure is gradually applied until the specimen small aggregate-like clay particle is crushed, the load in kilograms at the time of destruction being determined. An average value of 20 testings is designated the compression strength.

B. The preparation of the small aggregate-like activated clay by adding a disintegration preventive agent.

Clay A is chosen as the starting material. After preparation of the purified clay A and when adjusting its moisture content, an about 7 percent (as $SiO_2$) sodium silicate solution prepared using commercially available JIS Grade No. 3 sodium silicate is mixed with the clay in an amount of 2 percent (calculated as $SiO_2$ contained in the sodium silicate) and at the same time the moisture content of the purified clay A is adjusted to 45 percent. Thereafter, in accordance with the method described in A of Example I, sulfuric acid in an amount of 0.8 equivalent of the total basic constituents contained in the purified clay A is added and the mixture is kneaded with a liquid weight ratio of 1.35, then granulated and submitted to a dry heat treatment at 150°C. to obtain a solid reaction product of cylindrical shaped particles. The formed sulfate is then extracted and separated from the product and thereafter water-washed and dried. Thus an activated clay of rustling cylindrical particles having an average particle diameter of 0.3 ± 0.1 mm. is obtained.

The specific surface area, pore volume and compression strength under load of the small aggregate-like activated clay obtained by the dry acid treatment after addition of sodium silicate are measured and the results thereof are shown in Table VI.

When, by way of comparison, the compression strength under load of the small aggregate-like activated clay of average particle diameter 0.3 ± 0.1 mm obtained by the dry treatment with 0.8 equivalent of sulfuric acid in accordance with the procedure described in Example IV was measured, it was 4.5 kg.

C. The decolorization of soybean oil with the refining agents obtained in A and B, above.

Each of the foregoing small aggregate-like activated clays of improved compression strength is charged to a fixed bed type packed layer apparatus in accordance with the method described in B of Example I, and by operating as described therein the decolorization of soybean oil is carried out under the conditions of a treatment temperature of 110°C. ± 5°C. amount used of the activated clay of 3 percent based on the oil and passage of the oil through the packed layer at the rate of 10 grams per minute. The ratio of decolorization is determined from the light transmittances of the starting oil and the refined oil recovered, while the ratio of recovery is determined from the amount of refined oil recovered. These results are present in Table VI.

TABLE VI

| Activated Clay | Specific Surface Area ($m^2/g$) | Pore volume (ml/g) | Compression Strength (kg) | Decolorization (%) 420 m$\mu$ | Decolorization (%) 500 m$\mu$ | Oil Recovery (%) |
|---|---|---|---|---|---|---|
| Product obtained by the 2-stage method | 292 | 0.96 | 7.7 | 76.5 | 98.0 | 97.5 |
| Product obtained by the addition of a disintegration preventive agent | 303 | 1.04 | 8.4 | 76.7 | 98.2 | 97.5 |

It is apparent from the foregoing results that the small aggregate-like activated clay obtained by either the two-stage method of conjointly employing the dry and wet techniques of acid treatment, as described in A, above, or the method of incorporating a disintegration preventive agent, as described in B, above, is improved in the compression strength under load and is a refining agent which can effectively accomplish the refining of oil at a high ratio of recovery.

Example VII

This example describes the case where the refining agent comprising the small aggregate-like activated clay is varied as to the particle diameters of the small aggregates.

In preparing the small aggregate-like activated clay whose particle diameter are of varied size, the procedure described in A of Example I is followed. Using clay A as the starting material, sulfuric acid is added in an amount of 0.7 equivalent of the total basic constituents contained in the purified clay A and the mixture is kneaded with a liquid weight ratio of 1.35, after which the resulting kneaded mixture is granulated using granulators respectively equipped with one of the four classes of perforated plates, i.e., plates having perforations either 0.3, 0.6, 0.8 or 1.3 mm in diameter. The resulting particles are then heat treated at 150°C. to obtain rustling solid mixture particles of cylindrical shape. The basic sulfates formed during the reaction are extracted and removed with dilute sulfuric acid solution and water, followed by water-washing and drying of the particles to obtain rustling activated clay particles of cylindrical shape having the several diameters of about 0.2, 0.5, 0.7 and 1.2 mm and lengths of about 0.2 – 10 mm. The specific surface area and pore volume of these small aggregate-like activated clay particles of several particle diameters are measured. The measurements are shown in Table VII.

These small aggregate-like activated clay particles of four classes of particle diameters, 0.2, 0.5, 0.7 and 1.2 mm, together with a fifth class consisting of a mixture of these four classes of small aggregate-like activated clay particles in equal amounts and having particle diameters 0.2 – 1.2 mm are used in carrying out the decolorization of beef tallow by operating as described in B of Example I. The decolorization ratios and recovery ratios of the oil are determined for these experiments and are shown in Table VII.

0.2, 0.5, 0.7 and 1.2 mm or a mixture of particles having these various diameters the recovery of the beef tallow was not only high but the refining was also carried out effectively.

Example VIII

This example illustrates the case of a refining agent wherein the preparation of the small aggregate-like activated clay is carried out by another mode of operation.

As the starting material, the commercial powdered activated clay A having a specific surface area of 265 m/g and of the following composition is used.

| | |
|---|---|
| $SiO_2$ | 82.4 |
| $Al_2O_3$ | 7.22 |
| FeO | 0.32 |
| $Fe_2O_3$ | 1.60 |
| MgO | 0.24 |
| CaO | 1.51 |
| Ignition loss | 4.90 |

To separate portions of 200 grams of this powdered activated clay (dry) are added in each case 30 percent of a commercially avilable reagent aluminum sulfate $[Al_2(SO_4)_3\ 18 - 24\ H_2O]$ and a commercially available reagent sodium sulfate ($Na_2SO_4$), respectively. This is followed by the addition of water to adjust the liquid weight ratio to about 1.20, after which the mixtures are thoroughly kneaded and thereafter these mixtures are each granulated into cylindrical particles with a 0.5 mm perforated plate to thus obtain dry mixed aggregates of activated clay which have been incorporated with either aluminum sulfate or sodium sulfate.

When these mixed aggregates are heat treated in a 200°C. air bath both are obtained as rustling solid aggregates of small cylindrical shape. When these small solid aggregates are charged to the soluble salt extracting apparatus described in A of Example I and the aluminum sulfate or sodium sulfate incorporated is extracted and separated by a similar method as in the case of the extraction of the reaction-formed basic sulfates described in A of Example I, using dilute sulfuric acid and water, followed by drying, rustling activated clay particles of cylindrical shape of an average diameter 0.3 ± 0.1 mm are obtained in each case. The specific surface areas and pore volumes of the so obtained activated clay particles of cylindrical shape are measured, and the results are shown in Table VIII.

TABLE VII

| Particle Diameter of Small Aggregate-like Activated Clay (mm) | Specific Surface Area ($m^2/g$) | Pore volume (ml/g) | Decolorization (%) 420 m$\mu$ | Decolorization (%) 500 m$\mu$ | Recovery (%) |
|---|---|---|---|---|---|
| 0.2 | 298 | 1.03 | 75.5 | 97.9 | 97.5 |
| 0.5 | 298 | 1.04 | 74.2 | 97.3 | 97.5 |
| 0.7 | 298 | 1.04 | 69.8 | 91.6 | 97.5 |
| 1.2 | 298 | 1.04 | 63.7 | 85.2 | 97.5 |
| 0.2 – 1.2 (mixture) | 298 | 1.04 | 74.3 | 97.5 | 97.5 |

From the results presented above, it can be appreciated that in the case where the packed layer used in refining beef tallow was made up of the small aggregate-like activated clay having any of the particle diameters The decolorization of soybean oil is then carried out with the so obtained activated clay in accordance with the method and refining conditions described in B of Example I. The decolorization and recovery ratios of the oil are determined, and the results obtained are shown in Table VIII.

TABLE VIII

| Additive at Time of Preparing Small Aggregate-like Activated Clay | Specific Surface Area ($m^2/g$) | Pore volume (ml/g) | Decolorization (%) | | Oil Recovery (%) |
| --- | --- | --- | --- | --- | --- |
| | | | 420 m$\mu$ | 500 m$\mu$ | |
| aluminum sulfate | 273 | 0.93 | 76.2 | 97.2 | 97.5 |
| sodium sulfate | 268 | 0.88 | 75.8 | 96.7 | 97.5 |

It can be seen from the foregoing results that even when the refining agent consists of small aggregate-like activated clay obtained by the addition of an inorganic water-soluble salt to powdered activated clay, granulation of the mixture, heat treatment of the resulting particles and thereafter extraction and separation of the salts therefrom, the effective decolorization of soybean oil at a high ratio of recovery of the oil is possible.

Example IX

This example describes the instance where the refining of oils and fats is carried out effectively by using in multistage fashion the fixed bed type packed layer prepared by using the small aggregate-like activated clay.

As the small aggregate-like activated clay, that prepared in A of Example I and having a specific surface area of 296 $m^2/g$, a pore volume of 0.98 ml/g and an average particle diameter of 0.3 ± 0.1 mm is used, which is packed in two columns of the type described in B of Example I in amounts of 30 grams each. Two liters of soybean oil is then passed through the first tower at the rate of 10 grams per minute under the conditions of 110°C. ± 5°C. in accordance with the procedure of operation described in B of Example I, after which the soybean oil recovered from the first column is passed through the second column from which the decolorized soybean is recovered. The ratios of decolorization of the refined oils obtained from the first and second columns in this case as well as the ratios of oil recovery are determined. These results are shown in Table IX.

By way of comparison, two liters of soybean oil is passed at the rate of 10 grams per minute through a single column, i.e., the first column only, which has been packed with the same small aggregate-like activated clay in an amount of 60 grams, a twofold amount, and the refined soybean oil is recovered. The ratios of decolorization and recovery of refined oil are determined and these rates are also shown in Table IX.

TABLE IX

| Column | Decolorization (%) | | Recovery (%) |
| --- | --- | --- | --- |
| | 420 m$\mu$ | 500 m$\mu$ | |
| 1st | 47.4 | 85.0 | — |
| 2nd | 78.5 | 98.5 | 97.5 |
| single | 76.5 | 97.0 | 97.5 |

It is thus seen that the decolorization of the oil is more effectively accomplished by the use of a multistage packed layer even though the amount used of the clay based on the oil is the same, i.e. 3 percent.

Example X

This example illustrates the case where the refining of oils and fats by using the small aggregate-like activated clay is carried out by contacting the oil or fat with the small aggregate-like activated clay in the same fluidized phase.

As the small aggregate-like activated clay, one prepared as in A of Example I and having a specific surface area of 296 $m^2/g$, a pore volume of 0.98 ml/g and of particle diameter 0.3 ± 0.1 mm is used. One liter of beef tallow is placed in a 2-liter beaker and, after heating at 110°C. ± 5°C., 60 grams of the small aggregate-like activated clay is added and fluidized by stirring for 30 minutes. Next, this mixture of the small aggregate-like activated clay and the oil is passed through a 100 Tyler mesh wire netting and the refined beef tallow is recovered.

The decolorization and recovery ratios of the refined oil are determined. The values obtained are shown in Table X.

Even though the small aggregate-like activated clay particles were vigorously stirred in the fluidized phase of the oil and the activated clay, they did not disintegrate. Hence, none of such complicated operations as suction filtration were necessary in separating and recovering the refined oil, it being possible to effect the separation of the refined oil readily from the spent aggregate-like clay with a wire netting, e.g., as by filtration through sand.

TABLE X

| Decolorization % | | Recovery of Oil (%) |
| --- | --- | --- |
| 420 m$\mu$ | 500 m$\mu$ | |
| 74.0 | 97.0 | 97.0 |

It is thus apparent from the foregoing experiment that the decolorization of beef tallow can be readily and effectively accomplished even where the small aggregate-like activated clay is not held stationary in a fixed bed type packed layer but is brought into contact with the oil while in a fluidized state.

Example XI

This example illustrates a method of decolorizing and refining oily substances with the use of a small aggregate-like activated clay prepared by incorporating glass in acid clay powder as the pore-constituting inorganic solid substance.

A. Preparation of the small aggregate-like activated clay incorporated with glass powder.

As the starting Japanese acid clay, a purified clay A used in A of Example I is chosen. Glass powder prepared by grinding commercially available glass fiber and passing it through a 50 Tyler mesh sieve is chosen as the inorganic solid substance.

The earth and sand contained in starting clay A are separated by water sieve and the moisture content is adjusted to 45 percent. To 1 kg of the purified clay A were added 27.5 g (corresponding to 5 percent of the dry weight of the purified clay A) of glass powder and 375 g of concentrated sulfuric acid (having a concentration of 98 percent), and they are intimately mixed with each other. The amount of the sulfuric acid added corresponds to about 0.75 equivalent of the total basic metallic components contained in the starting clay A. The resulting plastic mixture of the above intimately blended three components is granulated into cylindrical granules 2.0 mm in diameter and about 3 – 7 mm in length by using a kneading glanulator (a commercial meat grinder). The liquid weight ratio of the blend glanulated at this time is 1.40. At this liquid weight ratio of 1.40 the blend can be kneaded and granulated sufficiently, and cylindrical small aggregates having a suitable hardness can be ob-tained. The resulting small aggregates are treated at 150°C. for 2 hours by operating as in A of Example 1 and the reacted basic constituents are separated by extraction to obtain a solid cylindrical product which produces a rustling sound when stirred by hand. The product is washed with sulfuric acid solution of pH 0.5 and with water. During the washing operation, the small aggregates of cylindrical shape do not crumble to slurry form but retain their aggregate form. When the small aggregates whose water-washing has been completed are dried for one hour at 110°C., small aggregate-like activated clay of an average diameter of 0.4 ± 0.2 mm incorporated with glass powder and treated with 0.75 equivalent of sulfuric acid is obtained.

The specific surface area and pore volume of the so obtained glass powder-incorporated, small aggregate-like activated clay are determined in accordance with the procedures hereinbefore described with the results shown in Table XI. The distribution of minute pores of diameter 0.02 – 10 microns, average pore diameter, packing density and acidity of clay are also determined and the results are shown in Table XI.

B. Decolorization and refining of oily substances.

The foregoing glass powder-incorporated, small aggregate-like activated clay is charged into a fixed bed type packed layer apparatus in accordance with the method described in B of Example I, and the decolorization of beef tallow and soybean oil is carried out by employing the activated clay in an amount of 3 percent based on the oil. The ratio of decolorization and the acid value and recovery ratio of the refined oil are determined, and the results are shown in Table XI.

TABLE XI

| | Aggregate-like activated clay according to this example |
|---|---|
| Specific surface area (m²/g) | 290 |
| Pore volume (ml/g) | 1.00 |
| Distribution of pores (ml/g) | |
| Diameter 10 – 1 $\mu$ | 0.065 |
| 1 – 0.5 $\mu$ | 0.027 |
| 0.5 – 0.1 $\mu$ | 0.111 |
| 0.1 – 0.02 $\mu$ | 0.219 |
| Pore volume of pores 0.02 – 10 $\mu$ in diameter (ml/g) | 0.4222 |
| Ratio of pores 0.02 – 10 $\mu$ in diameter to total pores (%) | 42.2 |
| Average pore diameter (A) | 172 |
| Packing density (g/ml) | 0.50 |
| Acidity of clay (meq/100g) | 10.29 |
| Decolorization ratio (%) | |
| Beef tallow 420 m$\mu$ | 76.5 |
| 500 m$\mu$ | 98.9 |
| Soybean oil 420 m$\mu$ | 96.1 |
| 500 m$\mu$ | 99.9 |
| Acid value of decolorized oil | 0.580 |
| Recovery ratio of decolorized oil (%) | 98.0 |
| Extraction and recovery by n-hexane (%) | 99.0 |
| Oil contained impregnated in used clay (%) | 0.2 |
| State of used clay | rustling granular |

From the results shown in the above table, it can be appreciated that when glass powder is dispersed as pore-constituting substance in the matrix of the small aggregate-like activated clay, the pore volume of the small aggregate-like activated clay is increased, particularly ratios of pores greater than 10 $\mu$ in diameter and pores smaller than 0.1 $\mu$ in diameter are increased and hence, the contact of the small aggregate-like activated clay with an oily substance to be decolorized is made highly efficient and an improved decolorizing effect can be attained, with the consequence that the oily substance can be recovered at a high ratio.

Example XII

This example illustrates a method of decolorizing oily substances with the small aggregate-like refining agents prepared by incorporating different classes of gel as pore-constituting inorganic solid substance in the matrix of the acid clay.

As the starting montmorillonitic clay, a purified clay A used in Example 1 is chosen.

As the pore-constituting inorganic substance, the following four gels are chosen: namely silica hydrogel, alumina-silica hydrogel, gel of water-containing titanium oxide and hydrogel of titanium phosphate.

As the silica hydrogel is used one prepared by neutralizing commercially available silicate with sulfuric acid and washing the neutralized product with water.

As the alumina-silica hydrogel, one prepared by mixing alumina hydroxide to the above silica hydrogel in an amount such that the dry weight ratio of the two components expressed in terms of $SiO_2$: $Al_2O_3$ is 2:1 and heating the mixture is used.

As the gel of water-containing titanium oxide a gel prepared by heat dissolving ilmenite ore ($FeO \cdot TiO_2$) in sulfuric acid, subjecting the extracted and recovered titanium sulfate solution to the customary thermal hydrolysis to thereby precipitate the titanium component as non-crystalline water-containing titanium oxide, separating the precipitate by filtration and drying the same is used.

As the titanium sulfate hydrogel a gel prepared by dissolving the above mentioned ilmenite ore in sulfuric acid by heating, adding to the recovered titanium sulfate under stirring commercially available phosphoric acid (concentration = 85 percent; specific gravity = 1.69) in an amount of 0.5 mole (calculated as $P_2O_5$) per mole of the titanium component (calculated as $TiO_2$), to thereby form a gel-like precipitate of titanium phosphate and washing the precipitate with an acid and with water is used.

Each of the above gels is added respectively to purified clay A (moisture content of 45 percent) in an amound of 5 percent calculated as the dried product based on the dry weight of the clay. Further, concentrated sulfuric acid is added to the system in an amount corresponding to about 0.75 equivalent. Then, the three components are intimately blended, and in accordance with the procedures described in Example 1 the granulation and drying in an air bath thermostat are conducted, following which the reacted basic constituents are extracted with the acid solution, washed with acid and with water and dried. As a result, small aggregate-like activated clays having an average diameter of 0.4 mm ± 0.2 mm and incorporated with the gel are obtained.

With respect to each of the so obtained small aggregate-like activated clays, the specific surface area and pore volume, the ratios of decolorizing beef tallow and soybean oil, the average pore diameter and packing density, the acid value and the ratio of the recovery of the decolorized oil are determined. The results are shown in Table XII.

gate-like activated clays, the specific surface area and pore volume, the recovery ratio of soybean oil and the

Table XII

|  | Silica hydrogel | Alumina-silica hydrogel | Gel of water-containing titanium oxide | Titanium phosphate hydrogel |
|---|---|---|---|---|
| Specific surface area $(m^2/g)$ | 280 | 288 | 280 | 280 |
| Pore volume (ml/g) | 0.99 | 0.99 | 1.10 | 1.20 |
| Decolorization ratio (%) |  |  |  |  |
| Beef tallow 420 m$\mu$ | 76.5 | 76.5 | 76.5 | 76.0 |
| 500 m$\mu$ | 99.2 | 99.0 | 99.1 | 99.1 |
| Soybean oil 420 m$\mu$ | 95.9 | 96.1 | 95.1 | 95.7 |
| 500 m$\mu$ | 99.9 | 99.8 | 99.8 | 99.7 |
| Average pore diameter (A) | 177 | 172 | 196 | 214 |
| Packing density (g/ml) | 0.42 | 0.45 | 0.52 | 0.51 |
| Acid value (meq/100g) | 9.80 | 13.50 | 10.65 | 11.60 |
| Recovery ratio of decolorized oil (%) | 98.0 | 98.0 | 98.0 | 98.0 |

From the results shown in the above table it can been seen that oily substances can be efficiently decolorized when refining agents prepared by adding a variable gel as the inorganic solid substance to thereby make greater the average pore diameter in the activated clay matrix and heighten the pore volume are used.

Example XIII

This example illustrates a method of decolorizing and refining oily substances with refining agents prepared by employing active carbon powder as the pore-constituting inorganic solid substance and varying the amount of the active carbon powder added.

As the starting montmorillonitic clay, a purified clay A used in Example I is chosen.

A commercially available active carbon powder for decolorization is chosen as the active carbon powder. The active carbon powder is added to the starting clay A in variable amounts of 1.0, 3.0, 8.0, 13.0 and 20.0 percent by weight (based on the dry weights of the carbon and clay), respectively. Coincidentally, the silica hydrogel (moisture content of 92.0 percent) used in Example XII is added as disintegration preventive agent to the system in an amount of 2 percent by weight calculated as the dried product based on the dry weight of the clay.

Concentrated sulfuric acid is added to each of the above blends of the clay A, the active carbon and the silica gel, in an amount corresponding to about 0.8 equivalent of the total basic constituents of the starting clay. Then, in accordance with the procedures described in Example I, the granulation and drying in an air bath thermostat are conducted, following which the reacted basic constituents are extracted with the acid solution, washed with acid and with water, and dried. As a result, black small aggregate-like activated clays incorporated with the active carbon in the above mentioned amounts, respectively are obtained.

With respect to each of the so obtained small aggre- acid value of the recovered oil are determined, and the results are shown in Table XIII below.

At the measurement of the decolorization, the three wavelengths of 420, 460 and 500 m$\mu$ are selected as the measuring points. Table XIII shows also the results of a control refining agent prepared without adding either the active carbon on the silica gel.

TABLE XIII

| Amount added of active carbon (%) | 0 | 1.0 | 3.0 | 8.0 | 13.0 | 20.0 |
|---|---|---|---|---|---|---|
| Specific surface area (m$^2$/g) | 300 | 278 | 280 | 282 | 290 | 295 |
| Pore volume (ml/g) | 0.96 | 0.98 | 1.00 | 1.03 | 1.15 | 1.20 |
| Average pore diameter (A) | 160 | 176 | 179 | 183 | 198 | 203 |
| Decolorization ratio (%) |  |  |  |  |  |  |
| 420 (m$\mu$) | 93.4 | 93.8 | 94.2 | 94.6 | 95.5 | 96.0 |
| 460 (m$\mu$) | 96.9 | 97.8 | 98.1 | 98.5 | 99.0 | 99.2 |
| 500 (m$\mu$) | 98.7 | 99.4 | 99.6 | 99.8 | 99.9 | 99.9 |
| Acid value of recovered oil | 0.620 | 0.600 | 0.580 | 0.550 | 0.510 | 0.482 |

From the results shown in the above table it can be seen that when active carbon is added as the pore-constituting inorganic substance to the matrix of the activated clay in a variable amount of 1.0 to 20.0 percent by weight, the pore volume of the small aggregate-like activated clay is increased and the decolorizing effect is highly promoted. At the same time, the decolorizing ability inherent to the active carbon is exerted synergistically with that of the activated clay, and the resulting active carbon-incorporated, small aggregate-like activated clay is particularly effective for decolorization in the vicinity of the wave length of 460 m$\mu$ and for lowering the acid value of the recovered oil.

Example XIV

This example illustrates the case where an oily substance is decolorized by employing a small aggregate-like activated clay into which glass fiber has been incorporated as the pore-constituting inorganic solid substance.

Clay A described in A of Example I is used as the starting montmorillonitic clay.

As the glass fiber, one obtained by cutting commercially available glass fiber into a length of 5 – 3 mm is used. The glass fiber powder is added to the purified clay A in an amount of 5 percent on the dry weight base.

Further, concentrated sulfuric acid is added to the system in an amount corresponding to about 0.75 equivalent of the total basic constituents contained in the clay, following which the granulation and drying in air bath thermostat are conducted. The reacted basic constituents are extracted with the acid solution, washed with acid and with water, and dried. As a result, a glass fiber-incorporated, small aggregate-like activated clay which has been treated with the acid of 0.75 equivalent of the basic constituents contained in the starting clay is obtained.

The specific surface area, pore distribution (measured by a mercury porosimeter), average pore diameter, packing density and acidity of the so obtained small aggregate-like activated clay are determined with the results shown in Table XIV below.

The so obtained glass fiber-incorporated, small aggregate-like activated clay is charged to a fixed bed type packed layer apparatus in accordance with the method described in B of Example I, and the decolorization of soybean oil is carried out by passing it through the packed layer. The ratio of decolorization of the oil, the acid value of the recovered oil and the ratio of recovery of the oil are determined with the results shown in Table XIV.

Table XIV

|  | Glass fiber-incorporqted small aggregate-like activated clay |
|---|---|
| Specific surface area (m²/g) | 296 |
| Total pore volume (ml/g) | 1.00 |
| Pore distribution 10 – 1 μ | 0.068 |
| 1 – 0.5 μ | 0.035 |
| 0.5 – 0.1 μ | 0.086 |
| 0.1 – 0.02 μ | 0.203 |
| Pore volume of pores 0.02 – 10 μ (ml/g) | 0.392 |
| Ratio of pores 0.02 – 10 μ in diameter to total pores (%) | 39.2 |
| Average pore diameter (A) | 180 |
| Packing density (g/ml) | 0.50 |
| Acidity of clay (meg/100g) | 11.6 |
| Decolorization ratio (%) |  |
| 420 mμ | 96.1 |
| 500 mμ | 99.9 |
| Acid value of recovered oil | 0.570 |
| Ratio of recovery of oil (%) | 98.0 |

From the results shown in the above table it can be seen that when the glass fiber is incorporated in the matrix of the small aggregate-like activated clay, not only pores having a diameter greater than 10 μ but also pores having a diameter less than 0.1 μ are increased in the system, whereby an efficient contact of the small aggregate-like activated clay with the oily substance can be attained and hence, the oily substance can be decolorized effectively.

We claim:

1. A refining agent for oily substances comprising granules or small aggregates of a clay consisting essentially of montmorillonite clay having a specific surface area of at least 120 square meters per gram, a pore volume of at least 0.7 milliliter per gram, said pore volume being defined by the equation:

$$\rho = (1/d_1) - (1/d_2)$$

wherein $d_1$ is the apparent density of the small aggregates, $d_2$ is the true density of the montmorillonitic clay, and $\rho$ is the pore volume in milliliters per gram and a ratio of the pore volume of pores of diameters of 0.02 – 10 microns to the total pore volume × 100 within the range of 35 to 75 percent.

2. The refining agent of claim 1, wherein the refining agent has a particle size of 0.1 to 5 mm.

3. A refining agent for oily substances comprising integrated small aggregates consisting essentially of a matrix of a montmorillonite clay and dispersed therein, 0.5 to 20 percent by weight, based on the total weight of said small aggregates, of a pore-constituting material in the form of particles having a diameter of 0.1 – 1,000 microns or fibers consisting essentially of an inorganic solid substance insoluble in either water or an acid selected from anhydrous silicic acids, aluminium silicate, magnesium silicate, calcium silicate, kaolin, talc, asbestos, glass, slags, fly ash, rock wool, silicon phosphate, alumina, titanium oxide, titanium phosphate, active carbon, graphite, anhydrous gypsum and barium sulfate, said small aggregates having a specific surface area of at least 120 square meters per gram, a pore volume of at least 0.7 milliliter per gram, said pore volume being defined by the equation:

$$\rho = (1/d_1) - (1/d_2)$$

wherein $d_1$ is the apparent density of the small aggregates, $d_2$ is the true density of the montmorillonitic clay, and $\rho$ is the pore volume in milliliter per gram and a ratio of the pore volume of pores of diameters of 0.02 – 10 microns to the total pore volume × 100 within the range of 35 to 75 percent.

* * * * *